United States Patent
Zheng (10) Patent No.: US 7,860,117 B2
(45) Date of Patent: Dec. 28, 2010

(54) COMMUNICATION PROXY METHOD, DEVICE AND SYSTEM

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 58 days.

(21) Appl. No.: 12/354,532

(22) Filed: Jan. 15, 2009

(65) Prior Publication Data

US 2009/0161677 A1   Jun. 25, 2009

Related U.S. Application Data

(63) Continuation of application No. PCT/CN2008/070649, filed on Apr. 1, 2008.

(30) Foreign Application Priority Data

Apr. 30, 2007   (CN) .................... 2007 1 0107108
May 15, 2007   (CN) .................... 2007 1 0107903

(51) Int. Cl.
    *H04L 12/56* (2006.01)
(52) U.S. Cl. ....................... 370/401; 370/466
(58) Field of Classification Search .............. None
    See application file for complete search history.

(56) References Cited

U.S. PATENT DOCUMENTS

| 7,174,376 | B1 | 2/2007 | Daruwalla | |
| 2002/0199203 | A1 | 12/2002 | Duffy | |
| 2003/0158967 | A1 | 8/2003 | Tripathi et al. | |
| 2006/0039390 | A1* | 2/2006 | Boyd et al. | 370/404 |
| 2006/0159008 | A1* | 7/2006 | Sridhar et al. | 370/216 |
| 2006/0159108 | A1* | 7/2006 | Chan | 370/401 |
| 2007/0153799 | A1* | 7/2007 | Sorrini et al. | 370/395.1 |
| 2008/0198857 | A1* | 8/2008 | Kim et al. | 370/401 |

FOREIGN PATENT DOCUMENTS

| CN | 1567882 A | 1/2005 |
| CN | 1614950 A | 11/2005 |

OTHER PUBLICATIONS

International Search Report issued in corresponding PCT Application No. PCT/CN2008/070649; mailed Jul. 17, 2008.
Supplementary European Search Report issued in corresponding European Patent Application No. 08 71 5382; issued May 19, 2009.

* cited by examiner

*Primary Examiner*—Chirag G Shah
*Assistant Examiner*—Daniel Mitchell
(74) *Attorney, Agent, or Firm*—Brinks Hofer Gilson & Lione (57) ABSTRACT

A communication proxy method, device and system are provided, including: after receiving a packet communicated between a provider device and the access device, performing a conversion process between the physical port and the logic port to physical port information or logic port information in the packet received according to the mapping information between the physical port and the logic port. Thus, it is ensued that the variation of the physical port does not affect the process in which the provider device provides services and the safety of each physical port in the access device is also guaranteed.

17 Claims, 8 Drawing Sheets

COMMUNICATION PROXY METHOD, DEVICE AND SYSTEM

RELATED APPLICATIONS

The present application is a continuation of PCT application PCT/CN2008/070649, filed on Apr. 1, 2008, entitled "METHOD, DEVICE AND SYSTEM FOR COMMUNICATION PROXY", which is incorporated by reference herein in its entirety.

The PCT application claims the priorities of Chinese Patent Application No. 200710107108.0 filed on Apr. 30, 2007, titled "COMMUNICATION PROXY METHOD, DEVICE AND SYSTEM" and Chinese Patent Application No. 200710107903.X filed on May 15, 2007, titled "COMMUNICATION PROXY METHOD, DEVICE AND SYSTEM", which are incorporated herein by reference in their entirety.

FIELD OF THE DISCLOSURE

The present disclosure relates to the communication technologies, and in particular, to a solution to implement a communication between a multi-provider device and an access device, and more particularly, to a communication proxy method, device and system.

BACKGROUND OF THE DISCLOSURE

In an access network, in order to support new services, a corresponding control function needs to be added on a device in the access network so that an operation support device can control the device of corresponding access network to support the new services.

The access network may include a plurality of devices supported by the provider support device, such as a lot of Access Nodes (ANs). In order to alleviate the burden of the provider support device due to controlling the devices in the access network, a Layer 2 Control Protocol (L2CP) is employed and a Broad Remote Access Server (BRAS) is used to control devices such as ANs in the access network.

Figure 1:
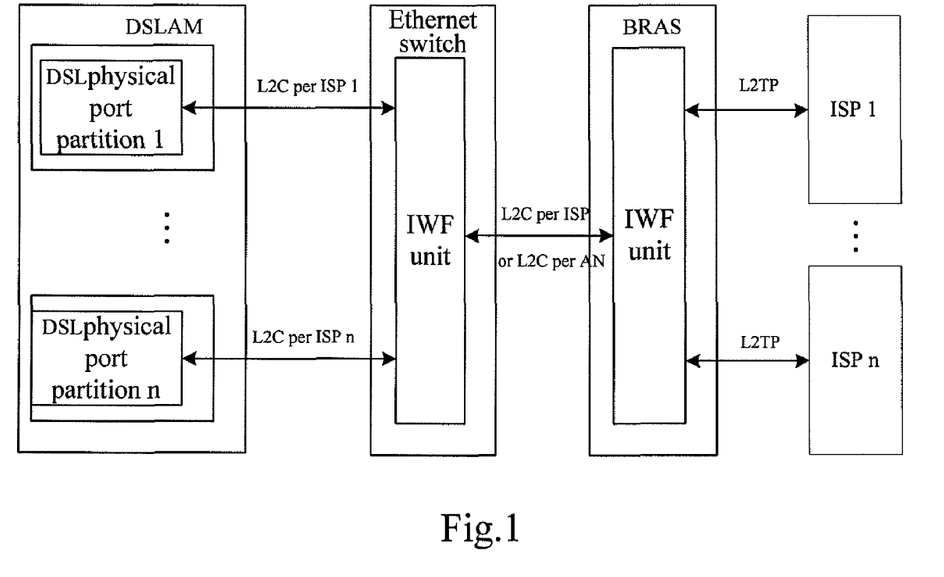
FIG. 1 is a diagram illustrating the structure of the system based on L2CP in the prior art.

With the application of L2CP in a digital subscriber line (DSL) system as an example, as shown in FIG. 1, DSL physical ports of a Digital Subscriber Line Access Multiplexer (DSLAM) in the DSL system are divided into DSL physical port partition according to the Service Provider (SP). For example, an Internet Server Provider (ISP) in FIG. 1 directly controls the DSL physical ports in corresponding DSL physical port partition.

In order to reduce the L2C message traffic communicated in the network, an L2CP proxy is provided in the network, in other words, the Interworking Function in FIG. 1 is configured in the network. The IWF is provided between an Ethernet switch and the BRAS and is adapted to filter, detect, aggregate and forward an L2C message according to the AN or ISP. Particularly, the operation of the IWF includes receiving a packet from the ISP, determining the AN corresponding to the packet according to the ISP sending the packet and forwarding the packet received to the AN (i.e. DSLAM in FIG. 1); and receiving a packet from the AN, determining the ISP corresponding to the packet according to the AN sending the packet and forwarding the packet received to the ISP. Thus, a corresponding relation between the ISP and the AN needs to be stored on the IWF and the AN and the ISP need to maintain information of each other respectively. For example, the ISP needs to maintain the physical port information of the AN so that the ISP can send information to corresponding AN.

During the implementation of the embodiments disclosed, the inventor finds that, in the prior art, the physical port of the provider device can not be separated with the physical port of the access device, so that a hidden danger in the system is caused.

SUMMARY OF THE DISCLOSURE

Embodiments of the present disclosure provide a communication proxy method, device and system, so as to improve the extendibility and safety of the access device during the communication between a plurality of provider devices and the access device.

One embodiment of the disclosure provides a communication proxy method, including: obtaining, by a communication proxy device, mapping information between a physical port of an access device and a logic port of a communication proxy device, after receiving a packet communicated between a provider device and the access device; performing a conversion process between the physical port and the logic port to physical port information or logic port information in the packet received according to the mapping information; and sending the packet after the conversion process.

Another embodiment of the present disclosure provides a communication proxy device, including: a packet receiving unit, adapted to receive a packet communicated between a provider device and an access device; a port mapping unit, adapted to obtain mapping information that defines the relationship between a physical port and a logic port and perform a conversion process between the physical port and the logic port to physical port information or logic port information in the packet received by the packet receiving unit according to the mapping information; and a packet sending unit, adapted to send the packet after the conversion process by the port mapping unit.

Another embodiment of the present disclosure provides a communication proxy system including an access device configured with at least one physical port partition comprising at least one physical port and a plurality of provider devices communicated with the access device through corresponding physical port partition in the access device; and the communication proxy system further includes: a communication proxy device, adapted to receive a packet communicated between the provider device and the access device, obtain mapping information that defines the relationship between the physical port of the access device and the logic port of the communication proxy device, perform a conversion process between the physical port and the logic port to the physical port or logic port in the packet, and send the packet after the conversion process.

As can be seen from the solution provided by the embodiments of the present disclosure, according to the embodiments of the present disclosure, the physical ports between the provider device and the access device are separated with the logic ports. Thus, the operations of the access device such as updating and maintenance are transparent to the provider device. Moreover, the hidden danger in the prior art is overcome and the safety of the physical port in the access device is ensured. Because the ISP can manage the logic ports of the ISP, the difference which is caused by the different identification methods of the physical lines rent from different network providers is shielded. Moreover, the logic ports are easy to be arranged in sequence, and thus the storage efficiency is enhanced, the advanced searching algorithm can be used and the compromise between the storage efficiency and searching speed is achieved. In other words, according to the embodiments of the present disclosure, the extendibility, safety, maintainability and storage and searching efficiency of the access device are effectively improved. Furthermore, it is guaranteed that each provider device can manage the logic ports of the provider device.

DETAILED DESCRIPTION OF THE EMBODIMENTS

According to embodiments of the present disclosure, after the packet communicated between the provider device and the access device is received, a conversion process between a physical port and a logic port is performed to the physical port information or the logic port information in the packet received. Thus, the physical ports between the provider device and the access device are separated. In this way, it is ensued that the variation of the physical port does not affect the process in which the provider device provides services and the safety of each physical port in the access device is also guaranteed.

Particularly, according to the embodiments of the present disclosure, at least one physical port partition including at least one physical port is configured on the access device; at least one logic port partition including at least one logic port is configured on the communication proxy device; and mapping information that defines the relationship between the physical port and the logic port is also configured and a corresponding logic port partition is assigned to each provider device.

Figure 2:
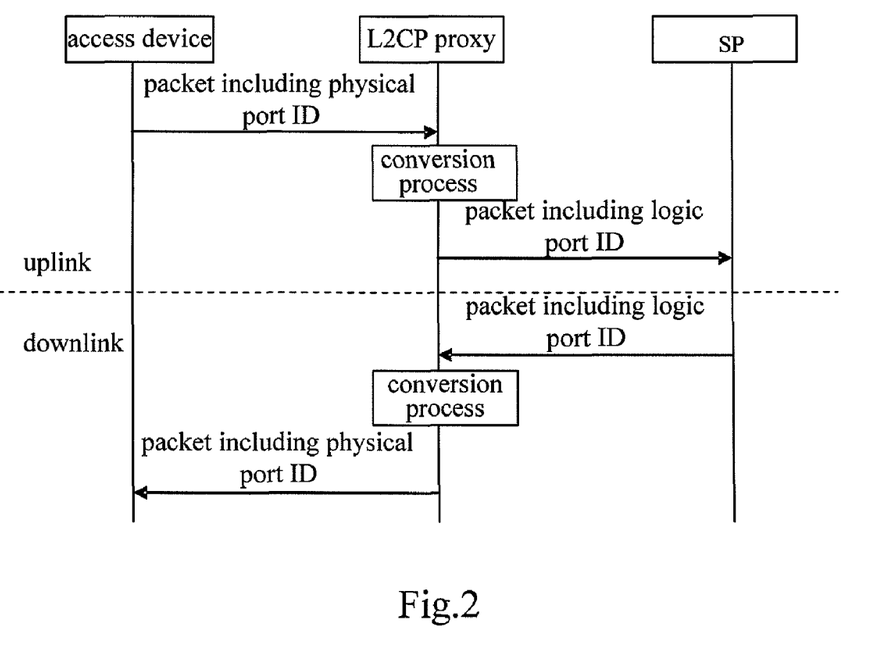
FIG. 2 is a diagram illustrating the communication process according to the embodiments of the present disclosure.

Correspondingly, FIG. 2 illustrates a process in which a plurality of provider devices are communicated with the access devices via a communication proxy. In other words, each provider device communicates with the access device via a physical port partition corresponding to the access device as follows.

1) In Uplink Direction

A middle entity (i.e. a communication proxy device) such as an L2CP proxy receives a packet sent from an access device to a Service Provider (SP) device. The packet includes a physical port ID.

The middle entity such as the L2CP proxy obtains mapping information that defines the relationship between a preconfigured physical port and logic port, and converts the physical port ID in the packet into a corresponding logic port ID according to the mapping information.

The packet which has been converted and includes the logic port ID is forwarded.

2) In Downlink Direction

The middle entity such as the L2CP proxy receives a packet sent from the provider device to the access device. The packet includes a logic port ID.

The middle entity such as the L2CP proxy obtains mapping information that defines the relationship between a preconfigured physical port and logic port, and converts the logic port ID in the packet into a corresponding physical port ID according to the mapping information.

The packet which has been converted and includes the logic port ID is forwarded.

The middle entity may be configured on other devices such as an access device and a device between other provider device and an access device. The middle entity may also be configured separately. If the middle entity is configured in the access device, the communication between the middle entity and the access device is implemented inside the access device.

In the above embodiment, the packet includes a control packet and/or data packet. Moreover, the packet includes a control packet communicated between the provider device and the access device. Or, a control packet communicated between an IP edge device connected with the provider device and the access device may be a packet based on L2CP so as to implement a configuration management on the physical port included in the physical port partition.

According to the embodiments of the present disclosure, if no mapping information is stored in the middle entity, the mapping information that defines the relationship between the physical port and the logic port may be preconfigured and stored in the middle entity. In particularly, each provider determines a unique logic port partition corresponding to a physical port partition in the access device, and the logic port partition and the physical port partition in the access device are in one-to-one correspondence or in many-to-one correspondence. In the case of the many-to-one correspondence, physical port resources are saved and the utilization ratio of the port resources is improved. In addition, in the case of the many-to-one correspondence, many logic port partitions may time-division multiplex the same physical port partition or share the same physical port partition with other policies.

In the communication proxy method according to the embodiments of the present disclosure, after the packet communicated between the provide device and the access device is received, a conversion process between the physical port and the logic port is performed to the physical port information or the logic port information in the packet received. Thus, the physical ports between the provider device and the access device are separated. In this way, it is ensued that the variation of the physical port does not affect the process in which the provider device provides services and the extendibility is improved, and the safety of each physical port in the access device is also guaranteed. Moreover, because the physical ports are arranged freely, it is difficult for the physical ports to be configured as a continual arrangement and the physical ports have to be searched through a one-by-one comparison. Hence, the searching efficiency is lowered and much storage space is occupied. However, only a little storage space is occupied by useful data. By using the logic port provided by the embodiment, the searching efficiency is improved and the useful storage efficiency of the storage space is enhanced because the logic port IDs can be arranged in sequence and can be searched in sequence. Furthermore, after the physical ports between the provider device and the access device are separated, the ISP can manage lines rented from different network service providers with the same logic port identification method, so that the maintenance of the physical port is easier.

Figure 3:
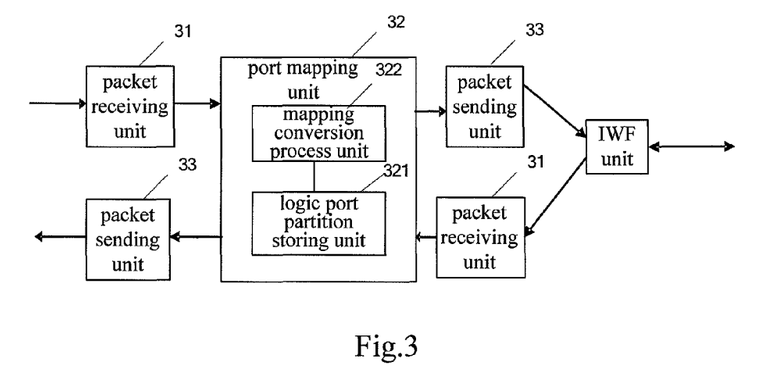
FIG. 3 is a diagram illustrating the structure of the device according to the embodiments of the present disclosure.

The structure of the communication proxy device according to the embodiments of the present disclosure is shown in FIG. 3 and includes the following units.

1) Packet Receiving Unit 31

The packet receiving unit 31 is adapted to receive a packet communicated between the provider device and the access device. The packet includes a control packet and a data packet. The control packet may be a control packet based on L2CP.

2) Port Mapping Unit 3

The port mapping unit is adapted to obtain mapping information that defines the relationship between a preconfigured physical port and logic port, and perform a conversion process to the physical port information or the logic port information in the packet received by the packet receiving unit 31 according to the mapping information.

Moreover, the port mapping unit 32 particularly includes a logic port partition storing unit 321 and a port mapping conversion unit 322.

The logic port partition storing unit 321 is adapted to obtain and store the mapping information that defines the relationship between preconfigured physical port and logic port.

The port mapping conversion unit 322 is adapted to perform the conversion process between the physical port and the logic port to the physical port information or the logic port information in the packet received according to the mapping information stored in the logic port partition storing unit 321. In particularly, the physical port ID in the packet sent from the access device to the provider device is converted into the logic port ID and the logic port ID in the packet sent from the provide device to the access device is converted into the physical port ID.

3) Packet Sending Unit 33

The packet sending unit 33 is adapted to send the packet processed by the port mapping conversion process unit 322. Particularly, the packet sending unit 33 is adapted to send the packet including the logic port ID after the conversion process to the provider device and send the packet including the physical port ID after the conversion process to the access device.

In the communication proxy device according to the embodiments of the present disclosure, after the packet communicated between the provide device and the access device is received, a conversion process between the physical port and the logic port is performed to the physical port information or the logic port information in the packet received. Thus, the physical ports between the provider device and the access device are separated. In this way, it is ensued that the variation of the physical port does not affect the process in which the provider device provides services and the safety of each physical port in the access device is also guaranteed. Moreover, by using the communication proxy device according to the embodiments of the present disclosure, after the physical ports between the provider device and the access device are separated, the ISP can manage lines rented from different network service providers with the same logic port identification method even though the network service providers use different methods for identifying the lines. Additionally, the port searching operation is simplified, the searching efficiency is improved and the useful storage efficiency of the storage space is enhanced because the logic port IDs can be arranged in sequence and can be searched in sequence.

Based on the above device, embodiments of the present disclosure further provide a communication proxy system for implementing a communication between a plurality of provider devices and an access device. The system includes the access device and the plurality of provider devices. At least one physical port partition including at least one physical port is configured in the access device. The plurality of provider devices communicate with the access device via corresponding physical port partitions in the access device respectively. The access device communicates with each provider device via the communication proxy device.

Furthermore, in the system, the communication proxy device may be configured separately or be configured in the access device, or be configured in a middle device between the access device and the provider device.

Furthermore, the system includes an Interworking Function unit i.e. IWF unit connected between the device and the provider device. The IWF unit is adapted to transport the information communicated between the device and the provider via an L2CP message.

For a better understanding of the embodiments of the present disclosure, descriptions related to different applications of the embodiments of the present disclosure will be provided with reference to the drawings. In the drawings, the communication between the access device and the provider device via the L2C message is provided as an example. However, during the practice application, other messages such as various data communication protocol messages may also be used between the access device and the provider device.

1. DSL System

Figure 4:
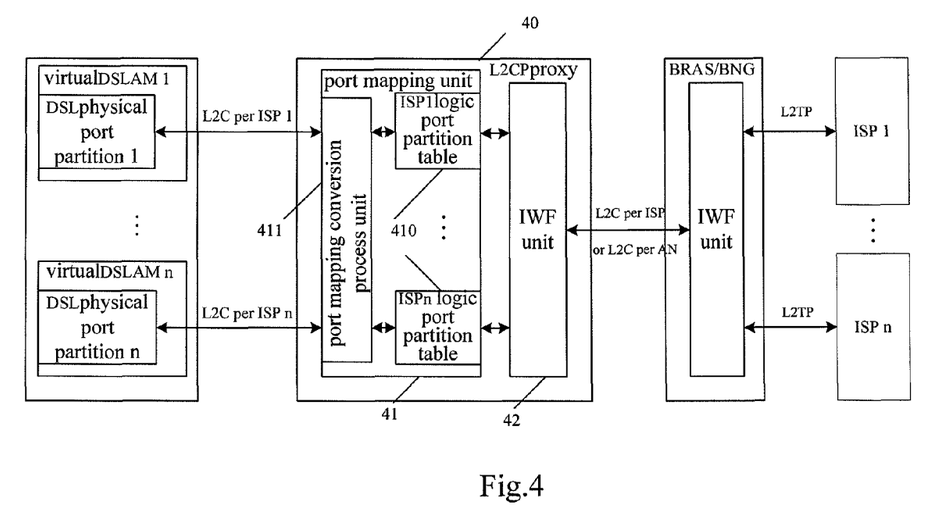
FIG. 4 is a first diagram illustrating the structure of the DSL system including the device according to the embodiments of the present disclosure.

FIG. 4 shows the structure of the DSL system where embodiments of the present disclosure are applied. A port mapping unit 41 is provided in an L2CP Proxy 40. The port mapping unit 41 includes a logic port partition storage unit 410 and a port mapping conversion process unit 411. The logic port partition storage unit 410 is adapted to store logic port partitions, for example, store a logic port partition table of the logic port partition. A Layer 2 Tunnel Protocol (L2TP) and an Authentication, Authorization, Accounting (AAA) protocol may be employed between the BNG and the ISP network device.

The logic port partition table uses the DSL physical port partition as an index to store the mapping relation between the logic port and the physical port. The mapping relation may be configured according to the corresponding relation between ISP and AN. The DSL physical port partition belonging to the same ISP or AN may be organized into one or more logic port partition table and are accessed and managed with L2C message via IWF 42 by corresponding ISP.

In the port mapping unit 41, a mapping relation in which the logic port partition and the DSL physical port partition are in one-to-one correspondence is used. In other words, one logic port partition table corresponds to one DSL physical port partition and each logic port in the logic port partition table and each physical port in the DSL physical port partition are in one-to-one correspondence.

The DSL physical port ID corresponding to the DSL physical port includes at least one or any combination of an actual AN ID, a chassis ID, a rack ID, a frame ID, a slot ID, a sub-slot ID, a port ID, a Virtual Path Identifier (VPI), a Virtual Channel Identifier (VCI), a Virtual Local Area Network Identifier (VLAN ID), an Ethernet Priority and a distinguish service code point (DSCP).

The logic port is a virtual port controlled or managed by the ISP. The logic port ID of the logic port may be Arabic numerals arranged in sequence, or at least one of a virtual AN ID, a chassis ID, a rack ID, a frame ID, a slot ID, a sub-slot ID, a port ID, a VPI, a VCI, a VLAN ID, an Ethernet Priority and a DSCP, or a corresponding character string.

Moreover, the mapping relation between the logic port partition table and the DSL physical port partition may be configured by a network administration system through a static configuration, or be configured or modified dynamically through a control signaling (such as an L2C message).

The communication procedure based on the port mapping unit 41 in the L2CP proxy 40 includes performing a port ID conversion process to the signaling, message or packet with the port ID. For a better understanding to the L2 control, detailed descriptions are provided reference to several embodiments. In addition, the present disclosure is not limited to the embodiments herein.

1) As for L2C Messages, L2C Messages of Different ISPs may be Separated Through VLAN or Virtual Router (VR).

In the downlink, the port mapping unit 41 receives an L2C message from Broadband Network Gateway (BNG) or BRAS, queries the logic port partition table corresponding to the ISP according to the logic port ID carried in the message to obtain the physical port ID, and then converts the logic port ID in the L2C message to a corresponding physical port ID and forwards the L2C message.

In the uplink, the port mapping unit 41 receives an L2C message from AN, queries the logic port partition table corresponding to the ISP according to the physical port ID carried in the message to obtain a corresponding logic port ID, and then converts the physical port ID in the L2C message to a corresponding logic port ID and forwards the L2C message.

2) As for Dynamic Host Configuration Protocol (DHCP) Messages, DHCP Messages of Different ISPs may be separated with VLAN or VR.

In the uplink, the port mapping unit 41 receives a DHCP message from AN, queries the logic port partition table corresponding to the ISP according to the physical port ID carried in the Option of the DHCP message such as Circuit ID in Option 82 to obtain the logic port ID, and then converts the physical port ID in the Option of the DHCP message (such as Circuit ID in Option 82) to a corresponding logic port ID and forwards the DHCP message.

Optionally, according to the embodiments of the present disclosure, the address option in the packet may also be configured based on the address of the entity which performs the conversion process. Particularly, the giaddr field in the Option of the DHCP message is configured according to the IP address of the L2CP proxy. In other words, the IP address of the L2CP proxy may be included in the DHCP message and then the forwarding process is performed.

3) As for PPP Over Ethernet (PPPoE) Packets, PPPoE Packets of Different ISPs may be Separated with VLAN or VR.

In the uplink, the port mapping unit 41 receives a PPPoE packet with TAG from AN, queries the logic port partition table corresponding to the ISP according to the physical port ID carried in the TAG of the packet such as access loop id in the TAG to obtain the logic port ID, and then converts the physical port ID in the TAG of the PPPoE packet (such as access loop id in the TAG) to a corresponding logic port ID and forwards the PPPoE packet.

Figure 5:
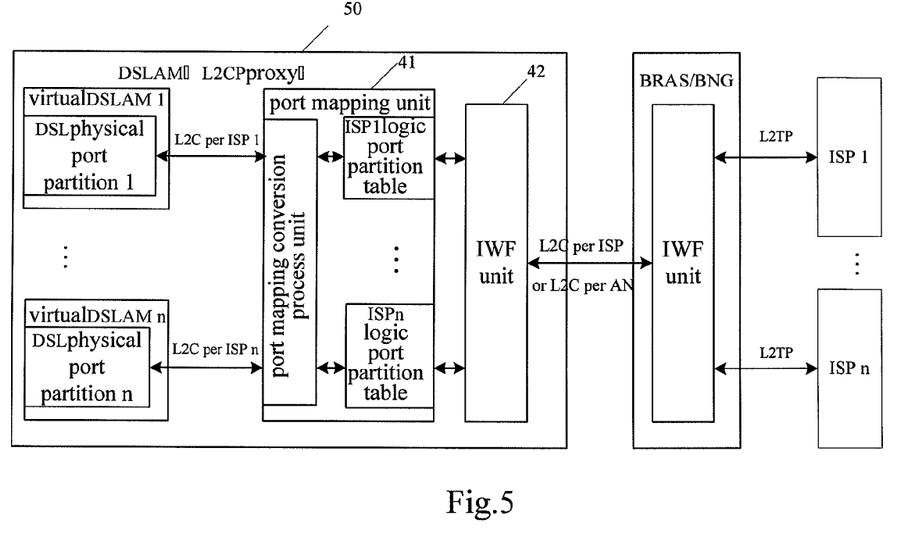
FIG. 5 is a second diagram illustrating the structure of the DSL system including the device according to a embodiments of the present disclosure.
Figure 6:
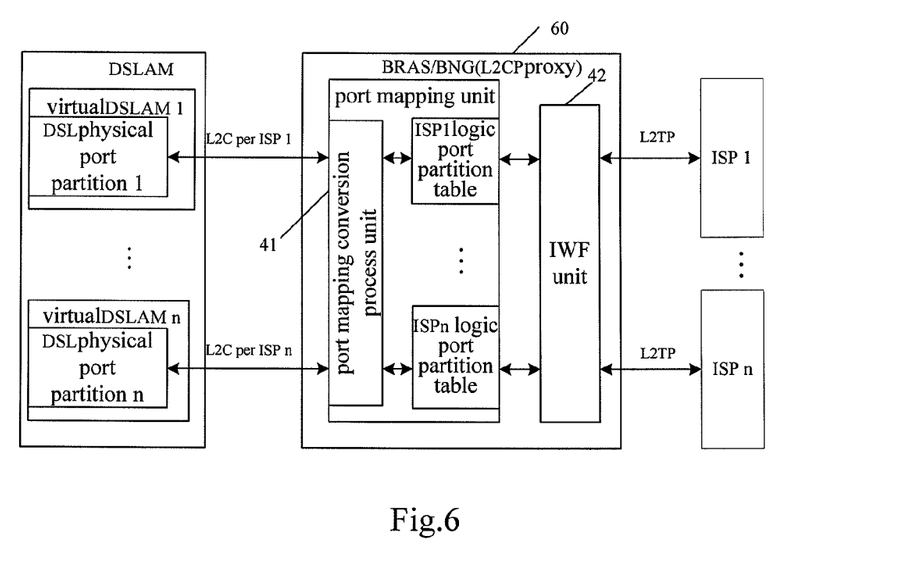
FIG. 6 is a third diagram illustrating the structure of the DSL system including the device according to the embodiments of the present disclosure.

The L2CP Proxy in the DSL system may be DSLAM 50 as shown in FIG. 5 or BNG or BRAS 60 as shown in FIG. 6. At this point, the port mapping unit 41 and IWF unit 42 may be configured in the DSLAM or in the BNG or BRAS.

Figure 7:
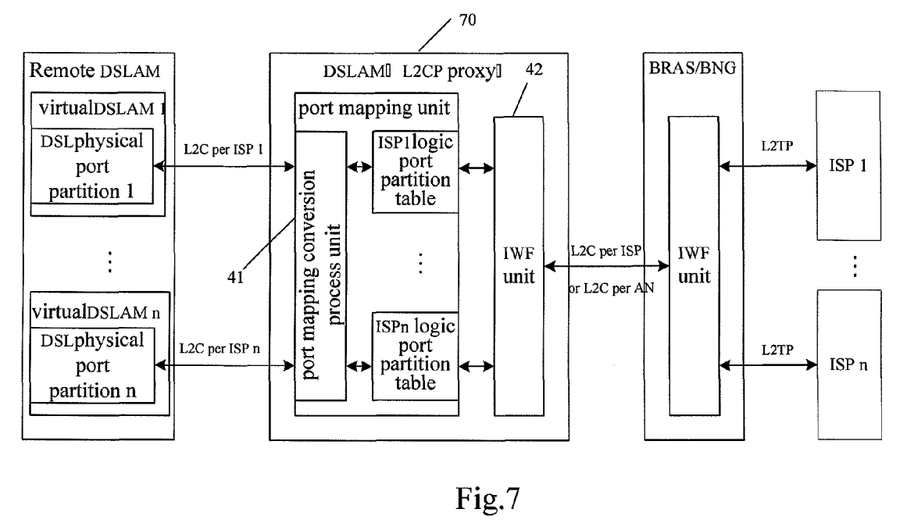
FIG. 7 is a fourth diagram illustrating the structure of the DSL system including the device according to the embodiments of the present disclosure.

In addition, in the case that the DSLAM includes a remote DSLAM, as shown in FIG. 7, the remote DSLAM 71 divides the DSL physical ports into at least one DSL physical port partition. The port mapping unit 41 and IWF unit 42 included in the L2CP proxy are configured in the DSLAM 70 at local side. The DSLAM 70 at local side is communicated with the remote DSLAM 71.

2. Passive Optical Network (PON) System

Figure 8:
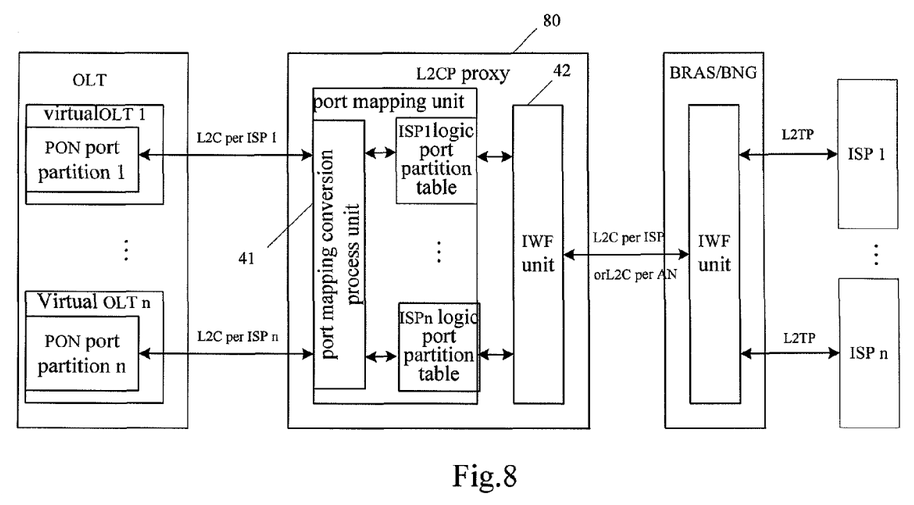
FIG. 8 is a first diagram illustrating the structure of the PON system including the device according to the embodiments of the present disclosure.

Embodiments of the present disclosure may also be applied in the PON system. The physical ports in the PON system are the PON ports. As shown in FIG. 8, the Optical Line Terminal (OLT) 81 in the PON system divides the PON ports into a plurality of PON port partition according to different SPs (such as different ISPs). Each PON port partition includes at least one PON port. The ISP directly controls the PON ports included in corresponding PON port partition via the L2CP proxy 80.

The functions of the port mapping unit 41 and the IWF unit 42 are similar to those of corresponding units in the DSL system, and the difference only lies in the definition of the port. In the PON system, the definition of the port is as follows.

The PON port ID of the PON port includes at least one or any combination of an actual AN ID, a chassis ID, a rack ID, a frame ID, a slot ID, a sub-slot ID, a PON interface ID, an ONU ID, a T-CONT (Transmission container) ID, a port ID, an Logic Link ID (LLID), a VLAN ID, an Ethernet Priority and a DSCP.

The logic port ID of the logic port is defined as a virtual port controlled or managed by the ISP. The logic port ID of the logic port may be Arabic numerals arranged in sequence, or be at least one or any combination of a virtual AN ID, a chassis ID, a rack ID, a frame ID, a slot ID, a sub-slot ID, a PON interface ID, an ONU ID, a T-CONT ID, a port ID, an LLID, a VLAN ID, an Ethernet Priority and a DSCP, or be a corresponding character string.

Figure 9:
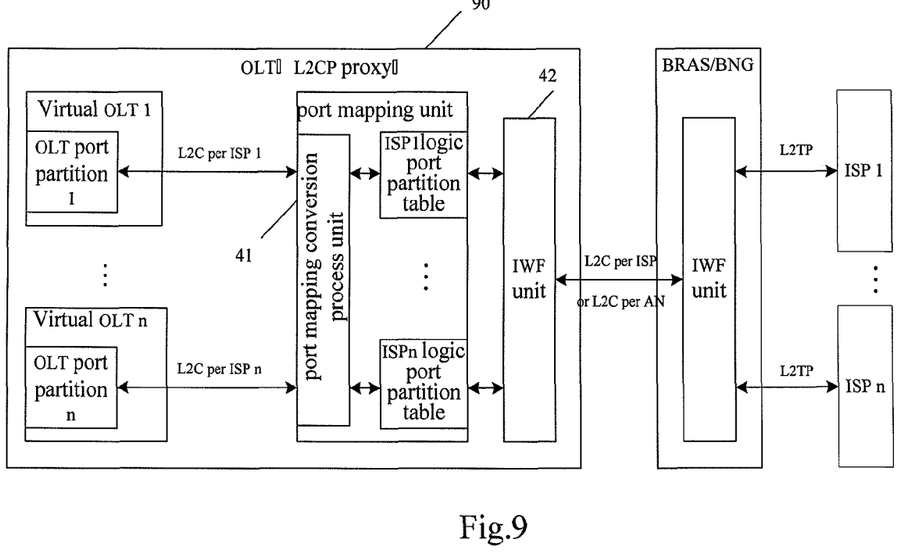
FIG. 9 is a second diagram illustrating the structure of the PON system including the device according to the embodiments of the present disclosure.
Figure 10:
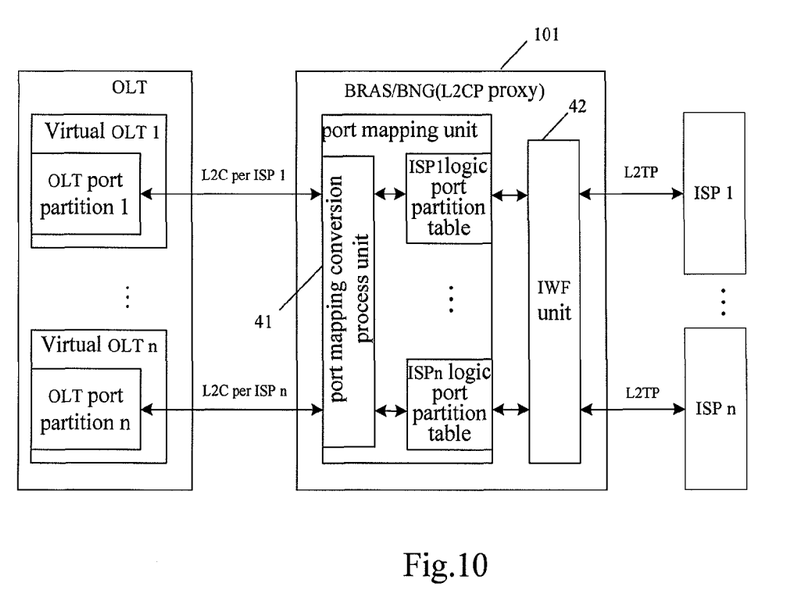
FIG. 10 is a third diagram illustrating the structure of the PON system including the device according to the embodiments of the present disclosure.

In the PON system, the L2CP proxy may be configured in the OLT 90 as shown in FIG. 9 or be configured in the BNG or BRAS 101.

Figure 11:
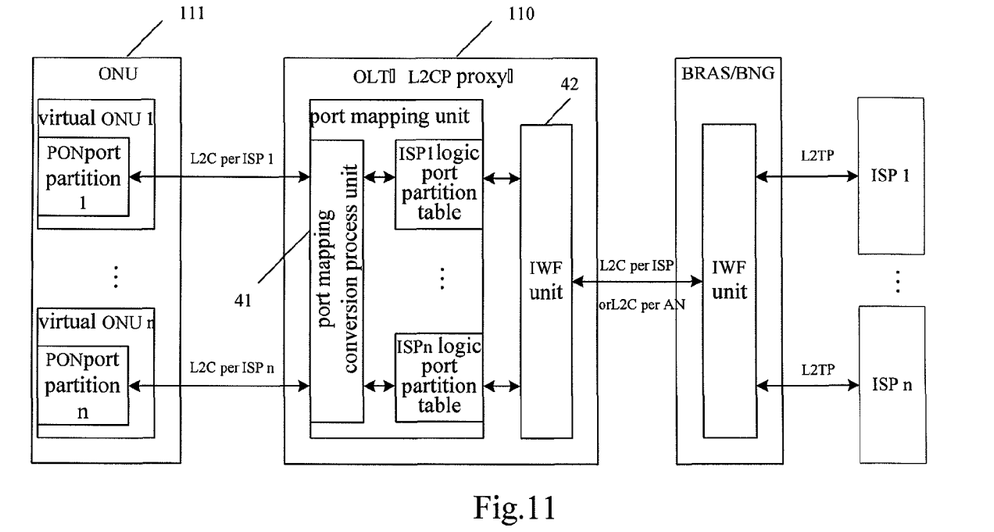
FIG. 11 is a fourth diagram illustrating the structure of the PON system including the device according to the embodiments of the present disclosure.

As shown in FIG. 11, the PON ports in the ONU 111 may be divided into a plurality of PON port partitions and the L2CP proxy may be configured in the OLT 110.

In the PON system, the communication between the access device and each provider with the port mapping unit is similar to that in the DSL system and repeat descriptions thereof are omitted.

3. Wireless Access System

Figure 12:
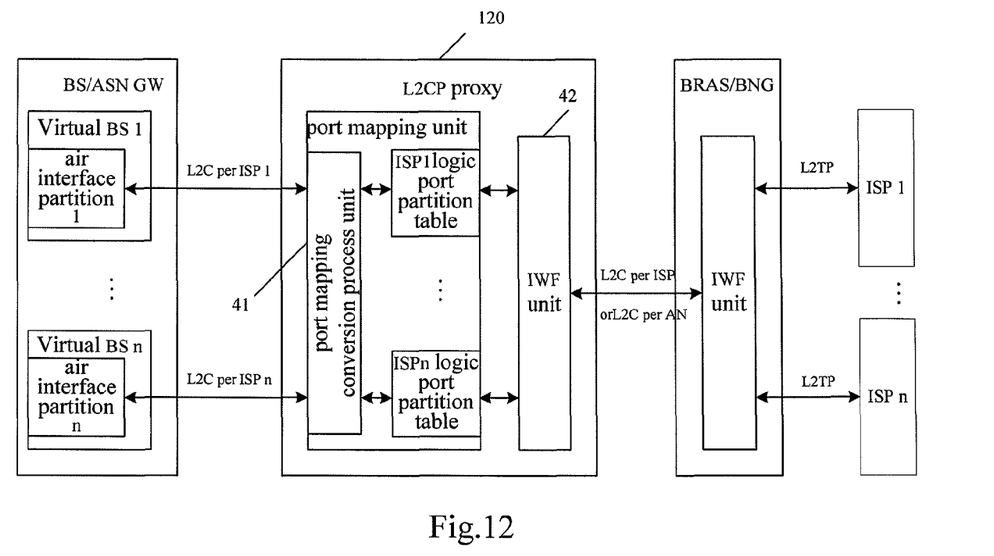
FIG. 12 is a first diagram illustrating the structure of the wireless access system including the device according to the embodiments of the present disclosure.

Embodiments of the present disclosure may also be applied in the wireless access system such as Worldwide Interoperability for Microwave Access (WiMAX) system. As shown in FIG. 12, the physical interface of the wireless access system is an air interface. The air interfaces are divided into a plurality of air interface divisions according to different SPs (such as different ISP). The ISP directly controls the air interfaces included in corresponding air interface division via the L2CP proxy.

The functions of the port mapping unit 41 and the IWF unit 42 in the L2CP proxy are similar to those of corresponding units in the DSL system, and the difference only lies in the definition of the air interface. The definition of the air interface is as follows.

The air interface ID of the air interface includes at least one or any combination of an actual AN ID, a chassis ID, a rack ID, a frame ID, a slot ID, a sub-slot ID, a remote radio unit (RRU) ID, a sector ID, a frequency point ID, a channel ID, an service flow ID/connection ID (SFID/CID), a VLAN ID, an Ethernet Priority and a DSCP.

The logic port ID of the logic port is defined as a virtual port controlled or managed by the ISP. The logic port ID of the logic port may be Arabic numerals arranged in sequence; or be at least one or any combination of an actual AN ID, a chassis ID, a rack ID, a frame ID, a slot ID, a sub-slot ID, an RRU ID, a sector ID, a frequency point ID, a channel ID, an SFID/CID, a VLAN ID, an Ethernet Priority and a DSCP; or be a corresponding character string.

Figure 13:
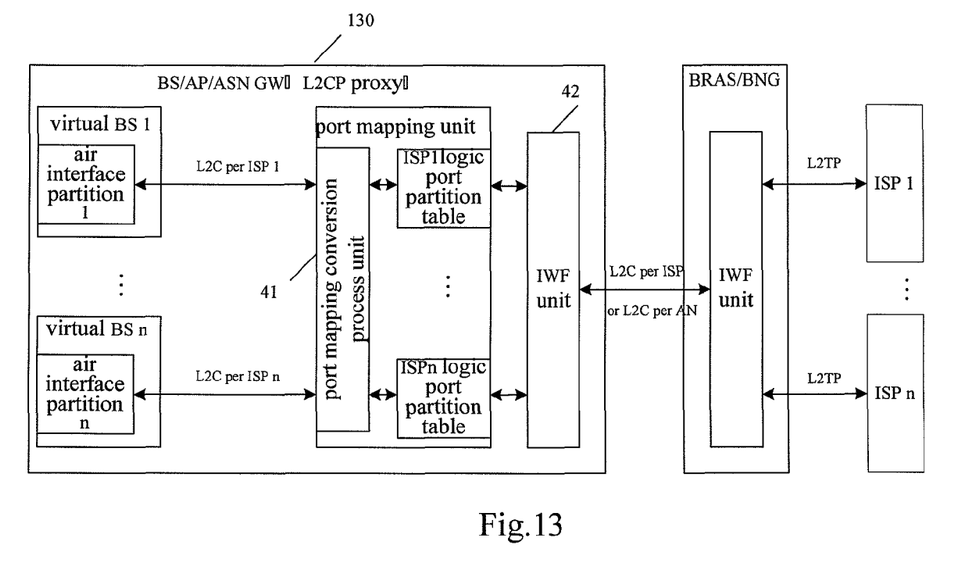
FIG. 13 is a second diagram illustrating the structure of the wireless access system including the device according to the embodiments of the present disclosure.
Figure 14:
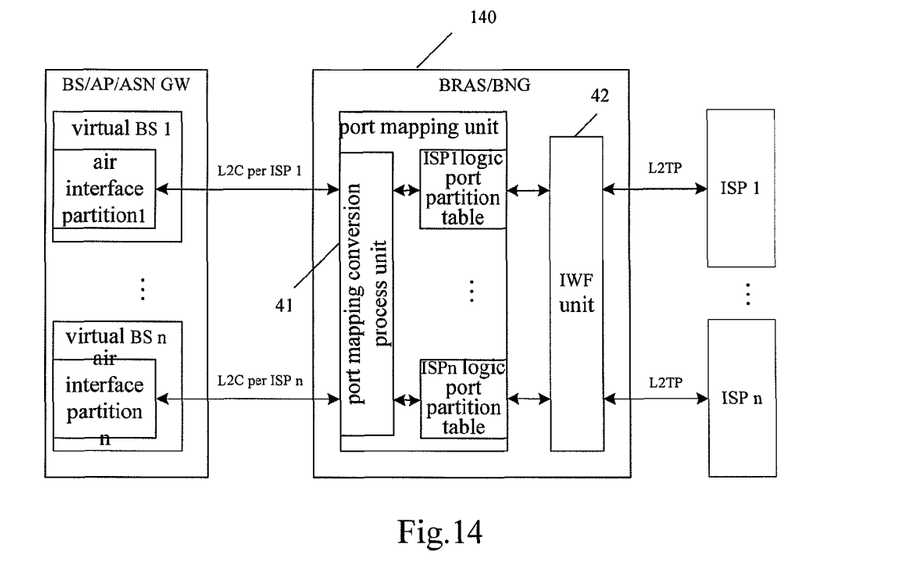
FIG. 14 is a third diagram illustrating the structure of the wireless access system including the device according to the embodiments of the present disclosure.

In the wireless access system, the port mapping unit 41 and IWF unit 42 included in the L2CP proxy may be configured in BS, access point (AP) or access service network gateway (ASN GW) as shown in FIG. 13 or be configured in BNG or BRAS 140 as shown in FIG. 14.

Figure 15:
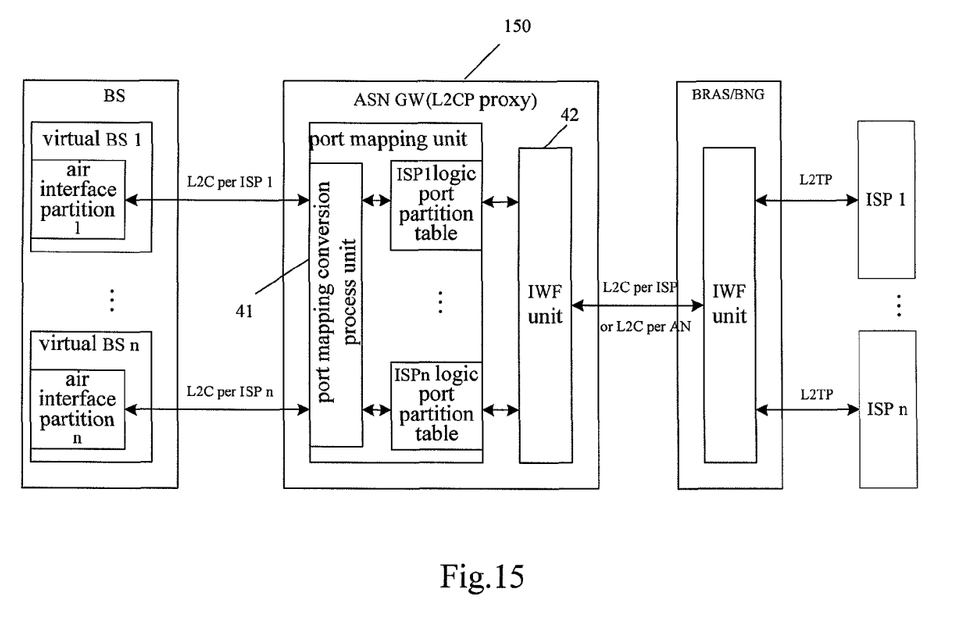
FIG. 15 is a fourth diagram illustrating the structure of the wireless access system including the device according to the embodiments of the present disclosure.

As shown in FIG. 15, a plurality of PON port partitions may be configured in the BS and the port mapping unit 41 and IWF unit 42 included in the L2CP proxy may be configured in ASN GW 150.

In addition, the AN according to the embodiments of the present disclosure may also be a mixed access point. At this point, the logic port partition table includes a plurality of logic ports, in other words, includes the logic ports corresponding to the physical ports including different access points. For example, if the AN is a mixed access point of DSLAM, OLT and BS, the corresponding logic port partition table includes the logic ports of the access points of DSLAM, OLT and BS.

In the wireless access system, the communication between the access device and each provider with the port mapping unit is similar to that of the DSL system and repeat descriptions thereof are omitted.

In summary, embodiments of the present disclosure implement the extendibility for the system communicated between the access device and the provider. In other words, when the access device such as DSLAM is updated or performed with other maintenance, the ISP does not need to be reconfigured even if the physical port changes. In addition, when the provider device occupies the physical port partition of the access device, the logic port partition corresponding to the physical port partition may be managed by the ISP. Thus, it is convenient for the ISP to manage corresponding ports. Moreover, the physical port partition and the logic port partition are separated, thus it is avoided that the ISP directly manages the physical ports in the access device and hence the hidden danger in the case that the ISP directly manages the physical ports in the access device is eliminated. Moreover, when the physical ports of the provider device and the physical ports of the access device are separated, the ISP can manage lines rented from different network service providers with the same logic port identification method, so that the maintenance for the physical port is easier. In addition, the searching efficiency is improved and the useful storage efficiency of the storage space is enhanced because the logic port IDs can be arranged in sequence and can be searched in sequence when the logic ports are used.

It should be emphasized that the embodiments described above are merely exemplary. Many variations and modifications may be made to the embodiments without departing substantially from the spirit and scope of the claims. All such modifications and variations are intended to be included herein within the scope of this disclosure and the above-described embodiments and protected by the following claims.

What is claimed is:

1. A communication proxy method, comprising:

receiving, by a communication proxy device, a packet communicated between a provider device and an access device; converting:

a) a physical port of the access device in the received layer 2 control protocol, L2CP, packet to the logic port used in the provider device or converting the logic port used in the provider device in the received L2CP, Dynamic Host Configuration Protocol, DHCP, or PPP over Ethernet, PPPoE, packet to the physical port of the access device according to a preset mapping information between a physical port of the access device and a logic port used in the provider device; and b) a physical port of the access device in the received Dynamic Host Configuration Protocol, DHCP, packet to the logic port used in the provider device or converting the logic port used in the provider device in the received DHCP packet to the physical port of the access device according to a preset mapping information between a physical port of the access device and a logic port used in the provider device; or c) a physical port of the access device in the received PPP over Ethernet, PPPoE, packet to the logic port used in the provider device or converting the logic port used in the provider device in the received PPPoE packet to the physical port of the access device according to a preset mapping information between a physical port of the access device and a logic port used in the provider device; and sending the packet after the converting;

wherein, the mapping information comprises a physical port ID of the physical port and a logic port ID of the logic port, and in a Digital Subscriber Line, DSL, system, the physical port ID comprises at least one of an actual access node ID, a chassis ID, a rack ID, a frame ID, a slot ID, a sub-slot ID and a port ID; and the logic port ID is Arabic numerals arranged in sequence, or at least one of a virtual access node ID, a virtual chassis ID, a virtual rack ID, a virtual frame ID, a virtual slot ID, a virtual sub-slot ID and a virtual port ID, or a character string;

in a Passive Optical Network, PON, system, the physical port ID comprises at least one of the actual access node ID, the chassis ID, the rack ID, the frame ID, the slot ID, the sub-slot ID, a PON interface ID, an optical network unit ID, a Transmission container ID, T-CONT ID and a port ID; and the logic port ID is Arabic numerals arranged in sequence, or at least one of virtual access network ID, a virtual chassis ID, a virtual rack ID, a virtual frame ID, a virtual slot ID, a virtual sub-slot ID, a virtual PON interface ID, a virtual optical network unit ID, a virtual T-CONT ID and a virtual port ID or a character string; and in a wireless access system, the physical port ID comprises at least one of the actual access network ID, the chassis ID, the rack ID, the frame ID, the slot ID, the sub-slot ID, a remote radio unit ID, RRUID, a sector ID, a frequency point ID, a channel ID, a service flow ID, SFID, and connection ID, CID; and the logic port ID is Arabic numerals arranged in sequence, or at least one of a virtual access network ID, a virtual chassis ID, a virtual rack ID, a virtual frame ID, a virtual slot ID, a virtual sub-slot ID, a virtual RRUID, a virtual sector ID, a virtual frequency point ID, a virtual channel ID, a virtual SFID and CID, or a character string.

2. The method according to claim 1, wherein,
in a Digital Subscriber Line, DSL, system, the physical port ID further comprises at least one of the virtual path ID, VPI, a virtual channel ID, VCI, a virtual local area network ID, VLAN ID, an Ethernet priority and a distinguish service code point, DSCP; the logic port ID further comprises at least one of a virtual VPI, a virtual VCI, a virtual VLAN ID, a virtual Ethernet priority and a virtual DSCP;
in a Passive Optical Network, PON, system, the physical port ID further comprises at least one of the VLAN ID, an Ethernet priority and a DSCP; the logic port ID further comprises at least one of a virtual VLAN ID, a virtual Ethernet priority and a virtual DSCP; and
in a wireless access system, the physical port ID comprises at least one of the VLAN ID, an Ethernet priority and a DSCP; the logic port ID further comprises at least one of a virtual VLAN ID, a virtual Ethernet priority and a virtual DSCP.

3. The method according to claim 1, further comprising,
configuring at least one physical port partition comprising at least one physical port through which the provider device is communicated with the access device via corresponding physical port partition, in the access device.

4. The method according to claim 3, wherein, the mapping information comprises a logic port partition uniquely corresponding to a provider device and corresponding to a physical port partition in the access device, a mutually corresponding logical port partition and physical port partition comprising a logic port and physical port in one-to-one correspondence.

5. The method according to claim 4, wherein, the logic port partition in the provider device and the physical port partition in the access device are in one-to-one correspondence or in many-to-one correspondence.

6. The method according to claim 4, further comprising:
before the packet converted is sent, configuring an address option in the packet according to an address of an entity for performing the conversion process.

7. The method according to claim 1, further comprising:
obtaining, by the communication proxy device, the mapping information between a physical port of the access device and a logical port used in the provider device.

8. A communication proxy device, comprising:
a packet receiving unit, configured to receive a packet communicated between a provider device and an access device;
a port mapping unit, configured to perform a conversion process from:
a) a physical port of the access device in the layer 2 control protocol, L2CP, packet received by the packet receiving unit to a logic port used in the provider device or from a logic port used in the provider device in the L2CP, Dynamic Host Configuration Protocol, DHCP, or PPP over Ethernet, PPPoE, packet received by the packet receiving unit to a physical port of the access device, according to a preset mapping information between the physical port of the access device and the logic port used in the provider device; and
b) configured to perform a conversion process from a physical port of the access device in Dynamic Host Configuration Protocol, DHCP, packet received by the packet receiving unit to a logic port used in the provider device or from a logic port used in the provider device in the DHCP packet received by the packet receiving unit to a physical port of the access device, according to a preset mapping information between the physical port of the access device and the logic port used in the provider device; or
c) configured to perform a conversion process from a physical port of the access device in PPP over Ethernet, PPPoE, packet received by the packet receiving unit to a logic port used in the provider device or from a logic port used in the provider device in the PPPoE packet received by the packet receiving unit to a physical port of the access device, according to a preset mapping information between the physical port of the access device and the logic port used in the provider device;
wherein, the mapping information comprises a physical port ID of the physical port and a logic port ID of the logic port, and
in a Digital Subscriber Line, DSL, system, the physical port ID comprises at least one of an actual access node ID, a chassis ID, a rack ID, a frame ID, a slot ID, a sub-slot ID and a port ID; and the logic port ID is Arabic numerals arranged in sequence, or at least one of a virtual access node ID, a virtual chassis ID, a virtual rack ID, a virtual frame ID, a virtual slot ID, a virtual sub-slot ID and a virtual port ID, or a character string;
in a Passive Optical Network, PON, system, the physical port ID comprises at least one of the actual access node ID, the chassis ID, the rack ID, the frame ID, the slot ID, the sub-slot ID, a PON interface ID, an optical network unit ID, a Transmission container ID, T-CONT ID and a port ID; and the logic port ID is Arabic numerals arranged in sequence, or at least one of a virtual access network ID, a virtual chassis ID, a virtual rack ID, a virtual frame ID, a virtual slot ID, a virtual sub-slot ID, a virtual PON interface ID, a virtual optical network unit ID, a virtual T-CONT ID and a virtual port ID, or a character string;
in a wireless access system, the physical port ID comprises at least one of the actual access network ID, the chassis ID, the rack ID, the frame ID, the slot ID, the sub-slot ID, a remote radio unit ID, RRUID, a sector ID, a frequency point ID, a channel ID, a service flow ID, SFID, and connection ID, CID; and the logic port ID is Arabic numerals arranged in sequence, or at least one of a virtual access network ID, a virtual chassis ID, a virtual rack ID, a virtual frame ID, a virtual slot ID, a virtual sub-slot ID, a virtual RRUID, a virtual sector ID, a virtual frequency point ID, a virtual channel ID, a virtual SFID and CID, or a character string; and
a packet sending unit, configured to send the packet after the conversion process by the port mapping unit.

9. The device according to claim 8, wherein, the port mapping unit comprises:
a logic port partition storing unit, configured to store the mapping information between a physical port of the access device and a logic port used in the provider device; and
a port mapping conversion process unit, configured to convert the physical port of the access device in the received L2CP packet to the logic port used in the provider device or convert the logic port used in the provider device in the received L2CP, DHCP or PPPoE packet to the physical port of the access device, according to the mapping information stored in the logic port partition storing unit.

10. The device according to claim 9, wherein the physical port ID of the physical port and the logic port ID of the logic port further comprises:

in a Digital Subscriber Line, DSL, system, the physical port ID further comprises at least one of the virtual path ID, VPI, a virtual channel ID, VCI, a virtual local area network ID, VLAN ID, an Ethernet priority and a distinguish service code point, DSCP; the logic port ID further comprises at least one of a virtual VPI, a virtual VCI, a virtual VLAN ID, a virtual Ethernet priority and a virtual DSCP;

in a Passive Optical Network, PON, system, the physical port ID further comprises at least one of the VLAN ID, an Ethernet priority and a DSCP; the logic port ID further comprises at least one of a virtual VLAN ID, a virtual Ethernet priority and a virtual DSCP; and in a wireless access system, the physical port ID comprises at least one of the VLAN ID, an Ethernet priority and a DSCP; the logic port ID further comprises at least one of a virtual VLAN ID, a virtual Ethernet priority and a virtual DSCP.

11. The device according to claim 8, wherein, the communication proxy device is a broadband network gateway BNG.

12. The device according to claim 9, wherein, the communication proxy device is a broadband network gateway BNG.

13. The device according to claim 10, wherein, the communication proxy device is a broadband network gateway BNG.

14. A communication proxy system comprising an access device configured with at least one physical port partition comprising at least one physical port and a plurality of provider devices communicated with the access device through corresponding physical port partition in the access device; wherein, the communication proxy system further comprises:

a communication proxy device, configured to a) receive a packet communicated between the provider device and the access device, obtain mapping information between the physical port of the access device and the logic port used in the provider device, perform a conversion process from the physical port of the access device in the layer 2 control protocol, L2CP, packet received to a logic port used in the provider device or from a logic port used in the provider device in the L2CP, Dynamic Host Configuration Protocol, DHCP, or PPP over Ethernet, PPPoE packet received to a physical port of the access device, according to the mapping information and send the packet after the conversion process; and b) receive a packet communicated between the provider device and the access device, obtain mapping information between the physical port of the access device and the logic port used in the provider device, perform a conversion process from the physical port of the access device in the Dynamic Host Configuration Protocol, DHCP, packet received to a logic port used in the provider device or from a logic port used in the provider device in the DHCP packet received to a physical port of the access device, according to the mapping information and send the packet after the conversion process; or c) receive a packet communicated between the provider device and the access device, obtain mapping information between the physical port of the access device and the logic port used in the provider device, perform a conversion process from the physical port of the access device in the PPP over Ethernet, PPPoE, packet received to a logic port used in the provider device or from a logic port used in the provider device in the PPPoE packet received to a physical port of the access device, according to the mapping information and send the packet after the conversion process;

wherein, the mapping information comprises a physical port ID of the physical port and a logic port ID of the logic port, and in a Digital Subscriber Line, DSL, system, the physical port ID comprises at least one of an actual access node ID, a chassis ID, a rack ID, a frame ID, a slot ID, a sub-slot ID and a port ID; and the logic port ID is Arabic numerals arranged in sequence, or at least one of a virtual access node ID, a virtual chassis ID, a virtual rack ID, a virtual frame ID, a virtual slot ID, a virtual sub-slot ID and a virtual port ID, or a character string;

in a Passive Optical Network, PON, system, the physical port ID comprises at least one of the actual access node ID, the chassis ID, the rack ID, the frame ID, the slot ID, the sub-slot ID, a PON interface ID, an optical network unit ID, a Transmission container ID, T-CONT ID and a port ID; and the logic port ID is Arabic numerals arranged in sequence, or at least one of a virtual access network ID, a virtual chassis ID, a virtual rack ID, a virtual frame ID, a virtual slot ID, a virtual sub-slot ID, a virtual PON interface ID, a virtual optical network unit ID, a virtual T-CONT ID and a virtual port ID, or a character string;

in a wireless access system, the physical port ID comprises at least one of the actual access network ID, the chassis ID, the rack ID, the frame ID, the slot ID, the sub-slot ID, a remote radio unit ID, RRUID, a sector ID, a frequency point ID, a channel ID, a service flow ID, SFID, and connection ID, CID; and the logic port ID is Arabic numerals arranged in sequence, or at least one of a virtual access network ID, a virtual chassis ID, a virtual rack ID, a virtual frame ID, a virtual slot ID, a virtual sub-slot ID, a virtual RRUID, a virtual sector ID, a virtual frequency point ID, a virtual channel ID, a virtual SFID and CID, or a character string.

15. The system according to claim 14, wherein, the communication proxy device comprises: a broadband network gateway, a broadband access server, or an access service network gateway.

16. The system according to claim 14, further comprising:

an interworking function unit, connected between the communication proxy device and an IP edge device or the provider device, configured to transport information communicated between the communication proxy device and the provider device through a Layer 2 control protocol message.

17. The system according to claim 14, wherein, the access device comprises: a digital subscriber line access multiplexer, a base station, an access point, an access service network gateway or an optical line terminal.

* * * * *